July 8, 1958 L. POLLOCK ET AL Re. 24,501

APPARATUS FOR MIXING FLUIDS

Original Filed Jan. 17, 1952

INVENTORS
LOU POLLOCK
HAROLD C. WALD
BY Toulmin & Toulmin
ATTORNEYS

United States Patent Office

Re. 24,501
Reissued July 8, 1958

24,501

APPARATUS FOR MIXING FLUIDS

Lou Pollock and Harold C. Wald, Dayton, Ohio, assignors to The Davies-Young Soap Company, Dayton, Ohio, a corporation of Ohio Original No. 2,699,731, dated January 18, 1955, Serial No. 266,956, January 17, 1952. Application for reissue August 5, 1955, Serial No. 526,799

4 Claims. (Cl. 103—262)

Matter enclosed in heavy brackets [ ] appears in the original patent but forms no part of this reissue specification; matter printed in italics indicates the additions made by reissue.

This invention relates to means and methods for selectively drawing a quantity of liquid cleasing material into a flowing stream of water.

The system of invention is designed primarily for the dispensing of liquid soap preparations, disinfectants, detergents and sanitizing solutions, and is particularly concerned with the employment of those cleansing materials with relation to the hand or machine washing of articles in restaurants, homes, and so forth. The system described eliminates spillage and waste of the cleansing material and further provides the desired relation of cleansing material and water for any given service condition. Also in many States laws directed to the maintenance of the public health set forth specific requirements in connection with the sanitizing and disinfecting solutions employable by those serving the public and the system and device of invention will comply with such specifications.

It is a primary object of the present invention to provide a soap dispensing system in which the cleansing material is mixed with a flowing stream of water before use.

It is an important object of this invention to provide a dispensing system in which the quantity of cleansing material introduced into a flowing stream of water may be readily controlled and may be reduced to zero when desired.

It is a particular object of this invention to provide a unique mixing unit for flowing cleansing material and water, which unit may be readily adapted to existing water line fixtures.

It is also a primary object of this invention to provide a novel method of dispensing liquid cleansing materials.

These and other allied objectives are attained by providing a unique unit for the controlled mixing of a liquid cleansing material with flowing water, which unit may be secured to an ordinary water faucet and may consist essentially of (1) a pressure ejector secured to a source of fluid pressure and a suction line connected into the said ejector, the suction line being provided with a valve selectively operable to connect the suction line and ejector with the atmosphere or with a source of supply of a liquid cleansing material. This cleansing material is provided in a container from which a conduit or bubble tube extends to the suction line of the mixing unit and the flow of liquid cleansing material, such as a liquid soap or a detergent, to the ejector, is controlled by a valve in the suction line. A valve provided in the suction line is adapted to cut off the flow of cleansing material to the ejector or mixing chamber and at the same time admit air thereto. Conversely, the air flow to the chamber is cut off when the valve is adjusted to secure a flow of liquid soap or detergent to the chamber.

Thus the valve of the mixing unit in the closed position thereof is adapted to shut off the liquid cleaning material flow and at the same time provides for the entry of air to the mixing chamber to assist in the maintenance of atmospheric pressure on the chamber side of the valve and thus inhibit leakage of liquid cleansing material through the valve while preventing water accumulation in the valve line on the chamber side thereof.

The invention will be more clearly understood by reference to the following detailed description and accompanying drawings wherein.

Figure 1:
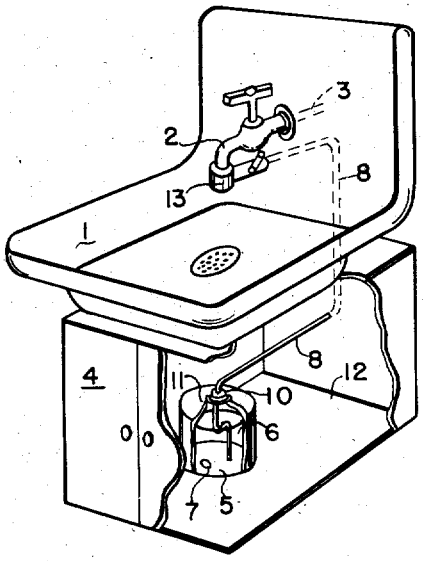
Figure 1 is a schematic view illustrating the system of the invention.

Referring to Figure 1 there is shown a basin 1 supporting a faucet 2 connected to a pressure line 3. Mounted below the basin is a cabinet 4 having a metal container 5 of liquid cleansing material 6 the container being provided with a normally closed port 7 in the base thereof; a bubble tube 8, which may be more generally termed a suction line, is shown extending from the container 5 and closure assembly 10 in the top 11 of the container through wall 12 to the mixing unit indicated generally at 13. Mixing unit 13 comprises (Figures 2 and 3) an ejector, that is, a stainless steel body portion 14 and a stainless steel wing portion 15, which wing portion is provided with a valve and a convenient fitting 17 for the securing of the conduit 8 thereto.

Figure 2:
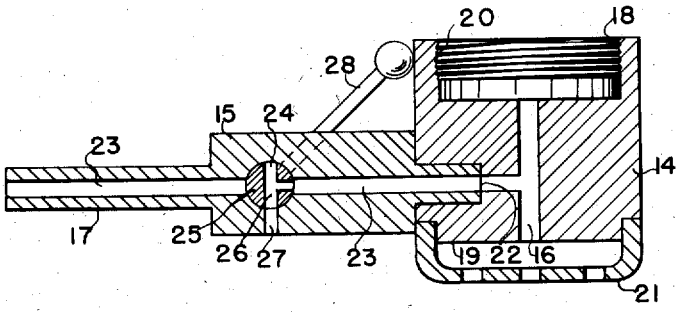
Figure 2 is a sectional view illustrating one position of the valve of the mixing unit.
Figure 3:
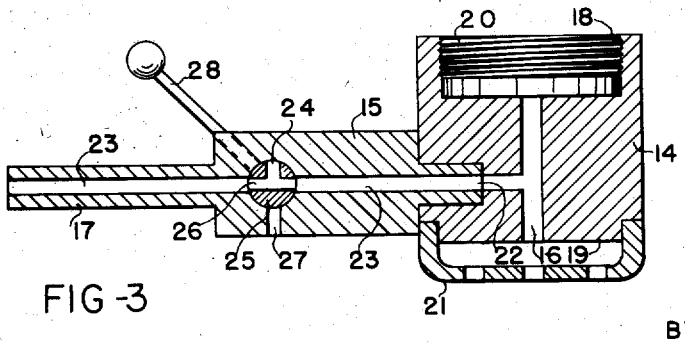
Figure 3 is a sectional view illustrating another position of the valve of the mixing unit.

As more clearly shown in Figures 2 and 3 the body portion 14 of the mixing unit defines a mixing chamber 16 in the form of a cylindrical passage and is provided with openings 18 and 19 for the flow of fluid therethrough. Opening 18 is defined by screw threads 20 in the body portion 14 and opening 19 is provided with a screen 21.

An aperture 22 provided in a wall of the body portion 14 interconnects with passage 23 of wing portion 15 which passage is recessed as at 24 to snugly accommodate a cylindrical member 25 extending transversely through the wing portion 15. The cylindrical member 25 at the intersection thereof with the passage 23 is provided with a T-shaped slot 26, and a channel 27 extends from the exterior of the wing portion to the T-shaped slot, as most clearly indicated in Figure 2.

Handle 28 is secured to an extension (not shown) of the cylindrical member 25 and is adapted to rotate the member 25 between the extreme positions shown in Figures 2 and 3. Thus it may be noted that in Figure 3 the handle 28 and member 25 are in such a position that liquid flowing in the passage from the left end thereof may pass through the slot 26 to the body portion 14, channel 27 being closed off, while in the position shown in Figure 2 the passage to the left is closed by the cylindrical member 25 and air may pass through the channel 27 and slot 26 to the body portion 14.

In the practice of the invention water flowing through line 3 passing downwardly through body portion 14 of the mixing unit creates a suction effect at the passage 23 and the liquid cleansing material is forced by the differential pressure from the container 5 through the open valve afforded by the T-slot 26 in cylindrical member 25 (Figure 3) and mixes with the water coursing through the body portion of the mixing unit. Thus a mixture of the cleansing material and water is readily procured by the user, and when it is desired to rinse articles with water only, valve handle 28 is thrown to the Figure 2 position, whereupon the flow of liquid cleansing material is cut off and atmospheric pressure is established in the right hand portion of passage 23 (Figure 2) by movement of air thereto through channel 27.

It will be readily understood that when valve handle 28 is in the Figure 2 position, that is with no liquid soap flowing, air, entering channel 27 and coursing through passage 23 will effectively prevent an accumulation of water in this passage and consequently the ability of the mixing unit to develop adequate suction pressure on movement of handle 28 to the Figure 3 position will not be deleteriously affected.

The materials used in the structure set forth are not critical and may preferably be of rubber, glass, plastic or steel. Those components which are subjected to suction must of course withstand the pressure without collapsing.

It will thus be noted that there has been provided a compact arrangement adapted for maximum cleanliness and economy in use and which arrangement has the particular feature that it readily provides simple water or any desired mixture of cleansing material and water in the washing solution.

It will be apparent to one skilled in the art and as noted hereinbefore that the term liquid cleansing material embraces liquid preparations of a cleansing nature and particularly includes liquid soap compositions, disinfectants, detergents and sanitizing solutions.

It will be understood that this invention is susceptible to modification in order to adopt it to different usages and conditions and accordingly, it is desired to comprehend such modifications within this invention as may fall within the scope of the appended claims.

What is claimed is:

*1.* A mixing unit for attachment to a faucet and comprising a body defining a cylindrical mixing chamber, said mixing chamber defining a cylindrical passage through said body, openings in opposite ends of said body and communicating with said mixing chamber, said mixing chamber having a smaller diameter than either of said openings, a wing portion projecting radially outwardly from said body portion and secured to said body portion intermediate the ends thereof, a longitudinal passage through said wing portion and communicating with said mixing chamber intermediate the ends thereof, a source of supply connected to said wing portion and communicating with said longitudinal passage, an air channel in said wing portion spaced from said mixing chamber and interconnecting said longitudinal passage and the atmosphere, a cylindrical recess at the junction of said air channel and said longitudinal passage, the longitudinal axis of said recess being transverse to and passing through said longitudinal passage, a valve member rotatably disposed within said recess, a transverse passage through said valve and adapted to be aligned with said longitudinal passage, a radial passage in said valve member perpendicular to said transverse passage and communicating between said transverse passage and the outer surface of said valve member, and manual operable means having two operating positions to rotate said valve member to selectively connect said mixing chamber with either of said air channel or said source of supply.

*2. In a mixing unit for attachment to a faucet and comprising a body defining a cylindrical mixing chamber, said mixing chamber defining a cylindrical passage through said body, openings in opposite ends of said body and communicating with said mixing chamber, said mixing chamber having a smaller diameter than either of said openings, a wing portion projecting radially outwardly from said body portion and secured to said body portion intermediate the ends thereof, a longitudinal passage through said wing portion and communicating with said mixing chamber intermediate the ends thereof, a source of supply connected to said wing portion and communicating with said longitudinal passage, an air channel in said wing portion spaced from said mixing chamber and interconnecting the longitudinal passage with the atmosphere, a two-position valve member rotatably disposed at the intersection of said longitudinal passage and said air channel to connect and disconnect said source of detergent from said mixing chamber and to establish atmospheric pressure in said mixing chamber, and manually-operable means on said valve member to selectively rotate the same into one of said two operating positions.*

*3. In a mixing unit for attachment to a faucet and comprising a body defining a cylindrical mixing chamber, said mixing chamber defining a cylindrical passage through said body, openings in opposite ends of said body and communicating with said mixing chamber, said mixing chamber having a smaller diameter than either of said openings, a wing portion projecting radially outwardly from said body portion and secured to said body portion intermediate the ends thereof, a longitudinal passage through said wing portion and communicating with said mixing chamber intermediate the ends thereof, a source of supply connected to said wing portion and communicating with said longitudinal passage, an air channel in one of said body and wing portions for admitting air to said longitudinal passage, said wing portion and longitudinal passage therethrough extending at right angles to said mixing chamber to provide for thorough mixing of the detergentr supply from the source with the water passing through the mixing chamber, a valve member having only two operating positions disposed in said longitudinal passage to intersect the longitudinal axis thereof and spaced from said mixing chamber, said valve member in one operating position interconnecting the mixing chamber with the source of detergent supply and in the other operating position disconnecting the source of detergent supply with said mixing chamber, and means on said valve member for controlling the air admitted through said air channel to said longitudinal passage.*

*4. A mixing unit for attachment to a faucet and comprising a body defining a cylindrical mixing chamber, said mixing chamber defining a cylindrical passage through said body, openings in opposite ends of said body and communicating with said mixing chamber, said mixing chamber having a smaller diameter than either of said openings, a wing portion projecting radially outwardly from said body portion and secured to said body portion intermediate the ends thereof, a longitudinal passage through said wing and body portions and communicating with said mixing chamber intermediate the ends thereof, a source of detergent supply connected to said wing portion and communicating with said longitudinal passage, valve means having only two defined operating positions and extending through said longitudinal passage, said valve means having passage means therein wherein in one position said passage means is aligned with said longitudinal passage to connect the source of detergent supply with the mixing chamber and in the other position said passage means is displaced from said longitudinal passage to disconnect said source of detergent supply from said mixing chamber, an air channel forming communication between said longitudinal passage and the atmosphere for establishing atmospheric pressure in said mixing chamber, and means for controlling the supply of air through said air channel.*

References Cited in the file of this patent or the original patent

UNITED STATES PATENTS

| | | |
|---|---|---|
| 1,491,115 | Taylor | Apr. 22, 1924 |
| 1,519,312 | Kelleher | Dec. 16, 1924 |

(Other references on following page)

UNITED STATES PATENTS

| | | |
|---|---|---|
| 1,553,299 | Adams | Sept. 15, 1925 |
| 2,260,887 | Dasher | Oct. 28, 1941 |
| 2,376,565 | Williams | May 22, 1945 |
| 2,381,589 | Hayes | Aug. 7, 1945 |
| 2,445,246 | Shallenberg | July 13, 1948 |

| | | |
|---|---|---|
| 2,462,752 | Kotches | Feb. 22, 1949 |
| 2,527,848 | Prack | Oct. 31, 1950 |
| 2,571,870 | Hayes | Oct. 16, 1951 |
| 2,621,908 | Young | Dec. 16, 1952 |
| 2,625,176 | Williams | Jan. 13, 1953 |
| 2,690,717 | Goodrie | Oct. 5, 1954 |